(12) United States Patent
Zhong

(10) Patent No.: US 10,942,055 B1
(45) Date of Patent: Mar. 9, 2021

(54) MEASURING CAP AND BOTTLE ASSEMBLY

(71) Applicant: Bing Zhong, Schaumburg, IL (US)

(72) Inventor: Bing Zhong, Schaumburg, IL (US)

(*) Notice: Subject to any disclaimer, the term of this patent is extended or adjusted under 35 U.S.C. 154(b) by 0 days.

(21) Appl. No.: 15/716,795

(22) Filed: Sep. 27, 2017

(51) Int. Cl.
*G01F 11/28* (2006.01)
*G01F 19/00* (2006.01)
*G01F 11/00* (2006.01)
*B65D 41/26* (2006.01)
*A47J 43/28* (2006.01)

(52) U.S. Cl.
CPC ............ *G01F 19/00* (2013.01); *A47J 43/28* (2013.01); *B65D 41/26* (2013.01); *G01F 11/003* (2013.01)

(58) Field of Classification Search
CPC ...... G01F 19/00; G01F 11/003; G01F 11/268; G01F 11/263; G01F 11/20; A47J 43/28; B65D 41/26
See application file for complete search history.

(56) References Cited

U.S. PATENT DOCUMENTS

| | | | | |
|---|---|---|---|---|
| 2,464,222 A * | 3/1949 | Fazekas | ............... | G01F 11/26 141/322 |
| 3,269,612 A * | 8/1966 | Bode | ............... | A47G 19/34 222/197 |
| 4,526,293 A * | 7/1985 | Kramer | ............... | B65D 83/0409 206/540 |
| 4,832,235 A * | 5/1989 | Palmer | ............... | A47G 19/24 222/370 |
| 5,123,574 A * | 6/1992 | Poulos | ............... | B65D 83/0409 215/253 |
| 5,265,776 A * | 11/1993 | Shabestari | ............ | G01F 11/261 221/288 |
| 5,465,871 A * | 11/1995 | Robbins, III | ...... | B65D 47/0814 222/142.5 |
| 6,179,167 B1 * | 1/2001 | Boot | ............... | B65D 23/003 141/346 |
| 6,244,470 B1 * | 6/2001 | Harley-Wilmot | ..... | G01F 11/263 222/153.14 |
| 6,283,339 B1 * | 9/2001 | Morrow | ............... | G01F 23/24 222/142.9 |
| 6,550,640 B2 * | 4/2003 | Smith | ............... | G01F 11/22 222/1 |
| 6,945,393 B2 * | 9/2005 | Cho | ............... | B65D 51/24 206/219 |
| 7,748,579 B1 * | 7/2010 | Shin | ............... | G01F 11/261 222/450 |

(Continued)

*Primary Examiner* — Vishal Pancholi
*Assistant Examiner* — Bob Zadeh
(74) *Attorney, Agent, or Firm* — Dillis V. Allen

(57) ABSTRACT

A measuring cap and bottle assembly for measuring liquids or fine particulate matter from a larger bottle into an integral measuring cup formed on top of a bottle cap with a depending skirt wall. A cooperating valve is formed between a top wall of the bottle and a flat cap wall that opens and closes upon manual rotation of the cap on the bottle. The cap is firmly snap-locked on an upper bottle neck by molded snap rings that limit movement of the cap to pure rotational movement as the cap is rotated from a closed position to an open position indicated by an arrow indicator found between the cap and the bottle. A removable cover on the bottle bottom permits the free rapid flow of liquid or material from the main body of the bottle.

14 Claims, 6 Drawing Sheets

(56) References Cited

U.S. PATENT DOCUMENTS

| | | | | |
|---|---|---|---|---|
| 8,925,768 B1* | 1/2015 | Ismail | ............... | G01F 11/268 |
| | | | | 222/41 |
| 2003/0006310 A1* | 1/2003 | Rothrum | ............ | B01F 15/0491 |
| | | | | 239/328 |
| 2008/0087690 A1* | 4/2008 | Parve | ................ | B65D 47/0847 |
| | | | | 222/485 |
| 2015/0014349 A1* | 1/2015 | Rau | ....................... | A47G 19/34 |
| | | | | 222/370 |
| 2015/0233748 A1* | 8/2015 | Egnor, Jr. | ............... | G01F 11/24 |
| | | | | 222/427 |

* cited by examiner

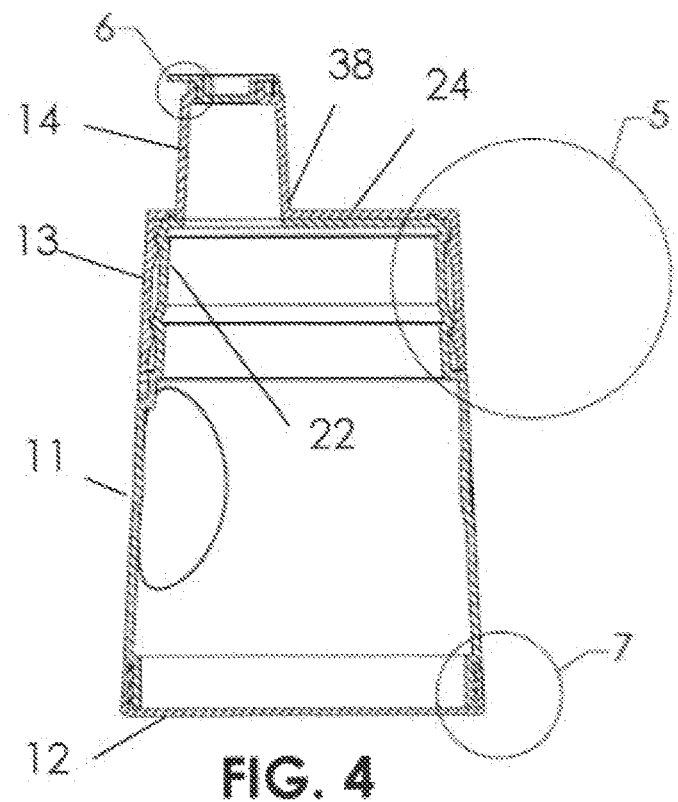
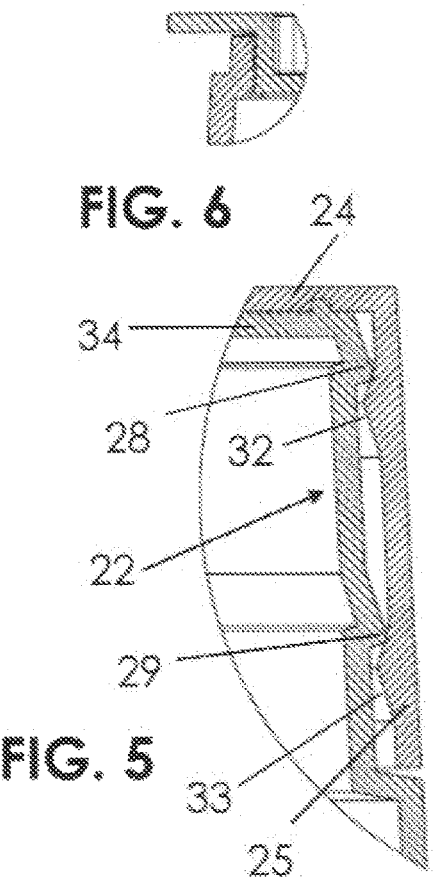
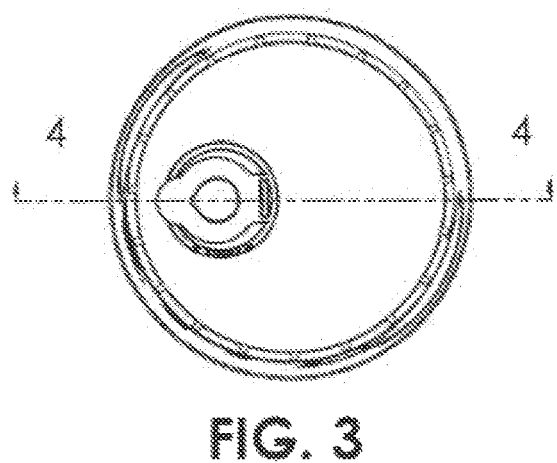
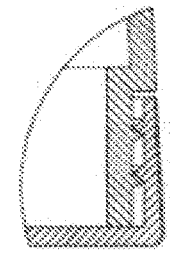
FIG. 4
FIG. 6
FIG. 5
FIG. 3
FIG. 7

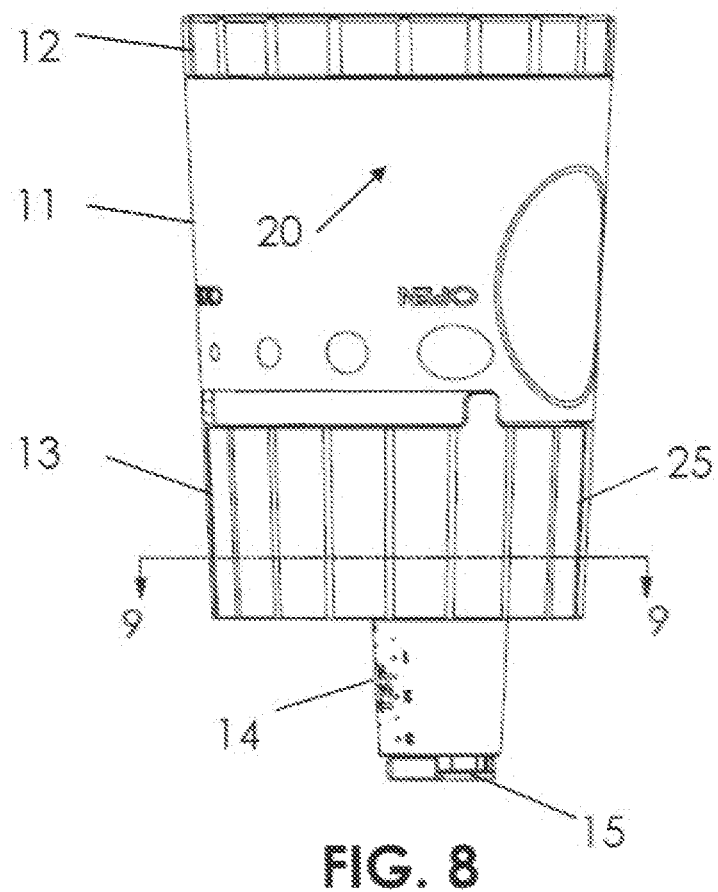
FIG. 8
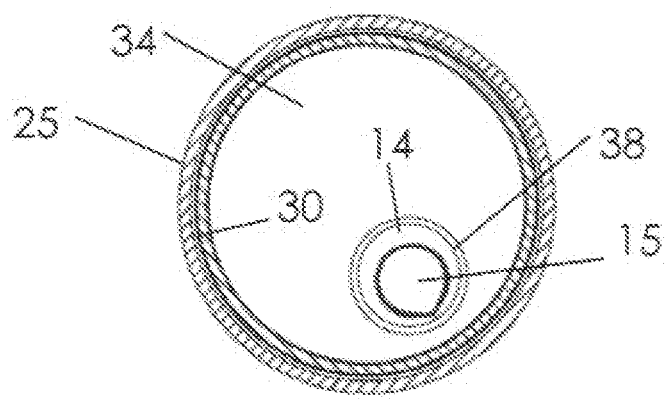
FIG. 9(OPEN)

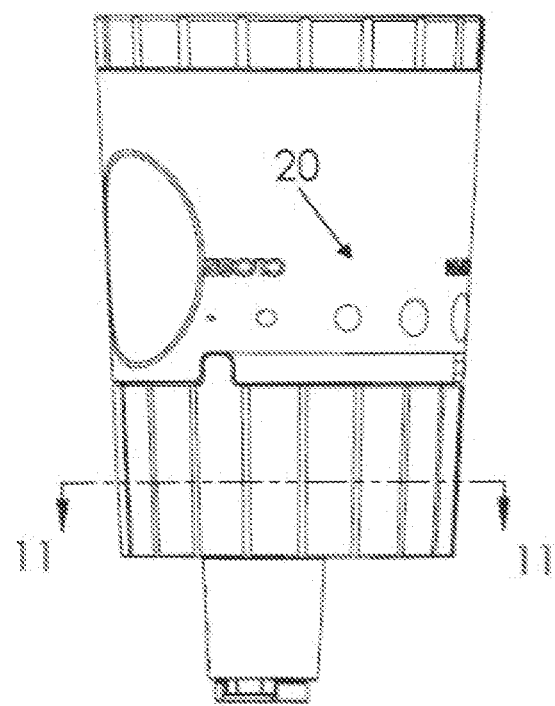
FIG. 10
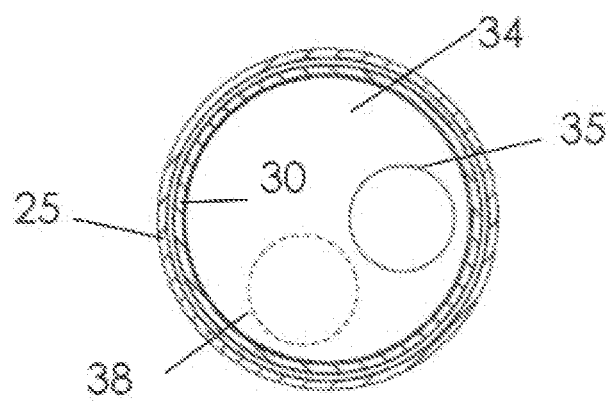
FIG. 11(CLOSE)

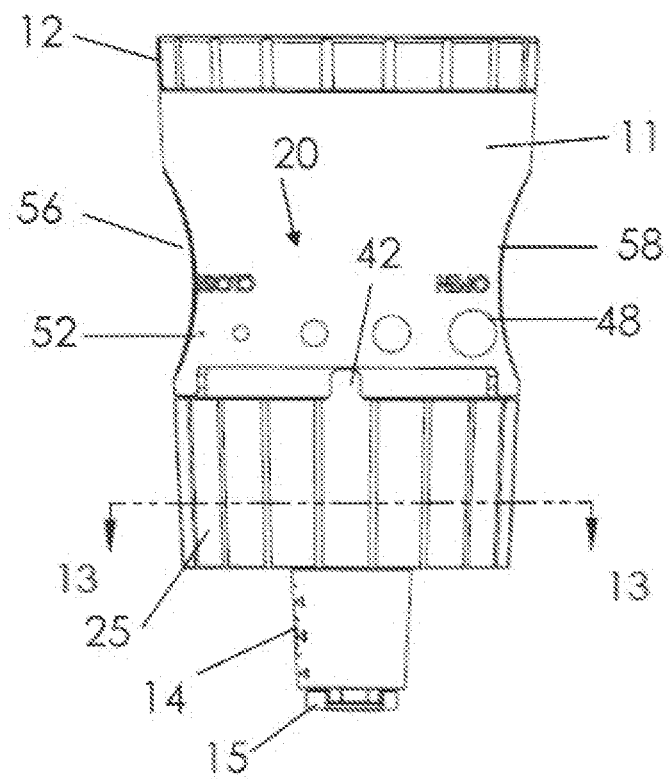
FIG. 12
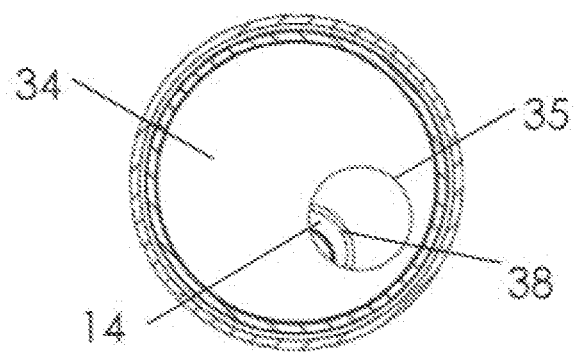
FIG. 13(PARTIAL)

MEASURING CAP AND BOTTLE ASSEMBLY

BACKGROUND OF THE PRESENT
INVENTION

Literally hundreds of measuring tools have been devised and marketed for use in the kitchen for the cook to measure and add ingredients to recipes or non-recipe food preparations, such as cups with volume indicia on its sides, spoons, cups and many others. Our research tells us that many of them are complex and better adapted for commercial use and not a homemaker's kitchen which requires any device to be simple, inexpensive and easy to use.

A preliminary search found the following patents and publications relevant to this invention.

In the Minihane, et al., U.S. Pat. No. 6,068,165, a rotary cap, when the container is upside down, fills the inner chamber designated 39, which in turn dispenses material into the chamber 60 upon axial movement, and then dispenses that material from the outer ring upon opening cap 45.

The Rau, U.S. Pub. No. 2015/0014349, shows a similar device that includes a main cap portion 202 that has individual chambers connectable with an opening on the cap 108 for dispensing liquid or particulate matter from the chambers inside the cap 202.

The tortuous flow of material and the requirement for precise axial movement of the parts in those prior systems are too complex and difficult for a homemaker's kitchen.

It is a primary object of the present invention of a Measuring Cup and Bottle Assembly to ameliorate the above problems in kitchen measuring systems.

SUMMARY OF THE PRESENT INVENTION

In accordance with the present invention, a Measuring Cap and Bottle Assembly is provided for measuring liquids or fine particulate matter from a larger bottle into an integral measuring cup formed on top of a bottle cap with a depending skirt wall. A cooperating valve is formed between a top wall of the bottle and a flat cap wall that opens and closes upon manual rotation of the cap on the bottle. The cap is firmly snap-locked on an upper bottle neck by molded snap rings that limit movement of the cap to pure rotational movement as the cap is rotated from a closed position to an open position indicated by an arrow indicator found between the cap and the bottle. The cap may be removed from the bottle neck with sufficient pressure for cleaning and replacement. A removable cover on the bottle bottom permits the free rapid flow of liquid or material from the main body of the bottle.

While the measuring cap is not removable from the neck of the bottle, it is locked on by a snap ring assembly that includes integral molded rings on the bottle neck that snap over barbs molded in the cap skirt interior, that limits the cap to rotary only motion as the user rotates the cap from its closed position to its open position.

The bottle neck also has an annular seal that fits in a groove in the underside of the cap top wall to prohibit the egress of liquid or particulate from the upper area of the bottle.

The valve position indicia includes a plurality of visual rings molded in the side of the bottle in the indicia area so the user can know the extent of the opening of the valve.

The valve includes cooperating circular apertures in the bottle neck top wall and the cap top wall, with the cap aperture being directly under the cup so material flows into the cup when the two apertures are in communication.

The cup has a capacity of about 3 tsp., although it could be varied depending upon the application for the present Measuring Cap Bottle Assembly. Olive oil dispensing is one application for this assembly but others will appear to those in the kitchen utensil industry.

BRIEF DESCRIPTION OF THE DRAWINGS

FIG. 3 is a top view of the Measuring Cap and Bottle Assembly illustrated in FIG. 2;

FIG. 4 is a longitudinal section of the present Measuring Cap and Bottle Assembly taken generally along lines 4-4 of FIG. 3;

FIG. 5 is an enlarged fragmentary section of the present Measuring Cap and Bottle Assembly taken in circle 5 in FIG. 4, showing the snap ring assembly;

FIG. 6 is an enlarged fragmentary section taken in circle 6 of FIG. 4 showing the cup lid of the present Measuring Cap and Bottle Assembly;

FIG. 7 is an enlarged fragmentary section of the present Measuring Cap and Bottle Assembly taken in circle 7 in FIG. 4 showing the lower bottle cover threads;

FIG. 8 is an assembly view of the present Measuring Cap and Bottle Assembly in its inverted loading and dispensing position, in its valve open position;

FIG. 9 is a cross-section through the cap taken along line 9-9 of FIG. 9 of the present Measuring Cap and Bottle Assembly, showing the cup aperture in alignment with the bottle aperture, permitting flow from the bottle into the measuring cup;

FIG. 10 is a Measuring Cap and Bottle Assembly according to the present invention, in its inverted position with the valve closed, and;

FIG. 11 is a cross-section taken generally along lines 11-11 of FIG. 10 showing the valve apertures in their spaced closed positions.

Figure 1:
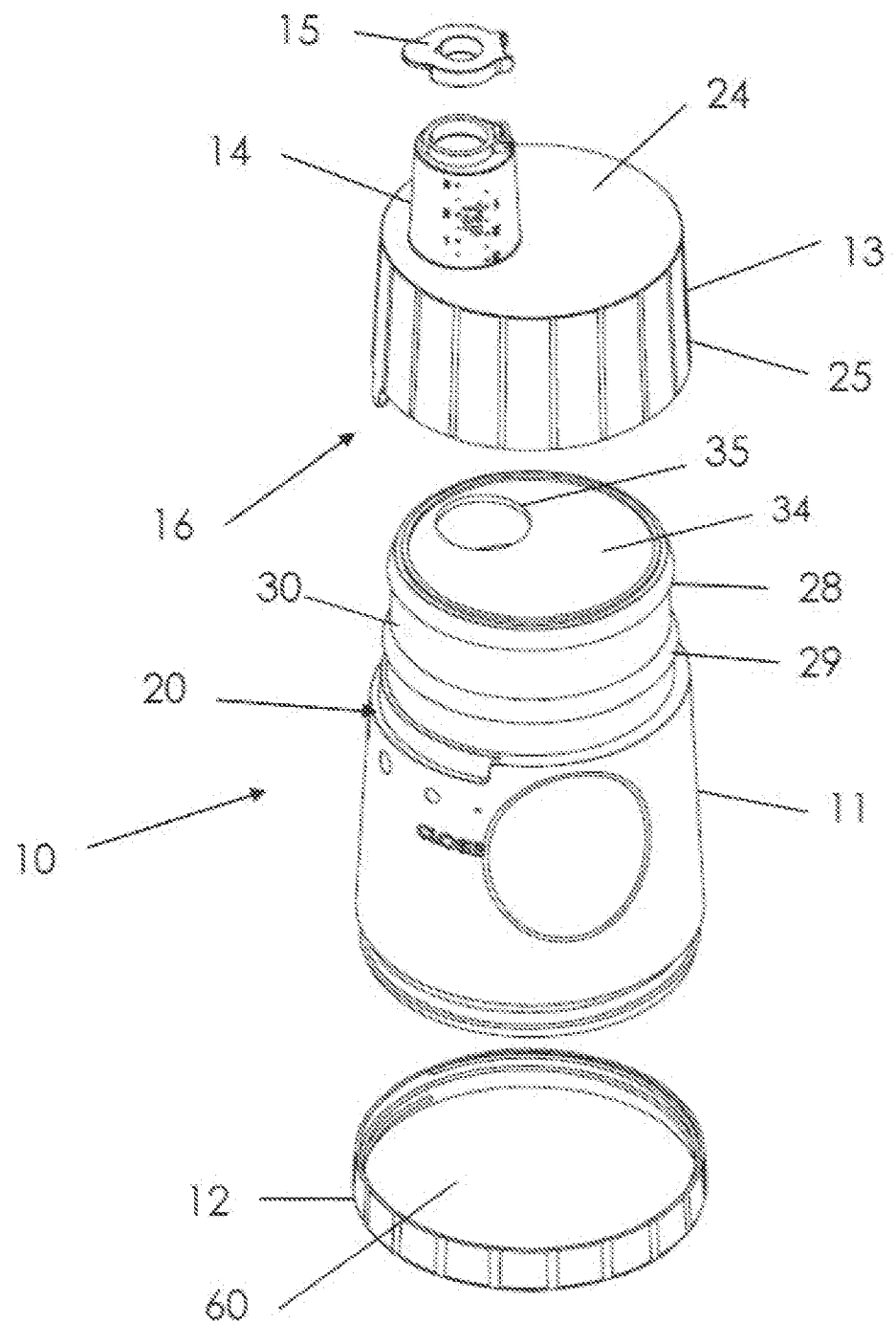
FIG. 1 is an exploded view of the present Measuring Cap and Bottle Assembly.
Figure 2:
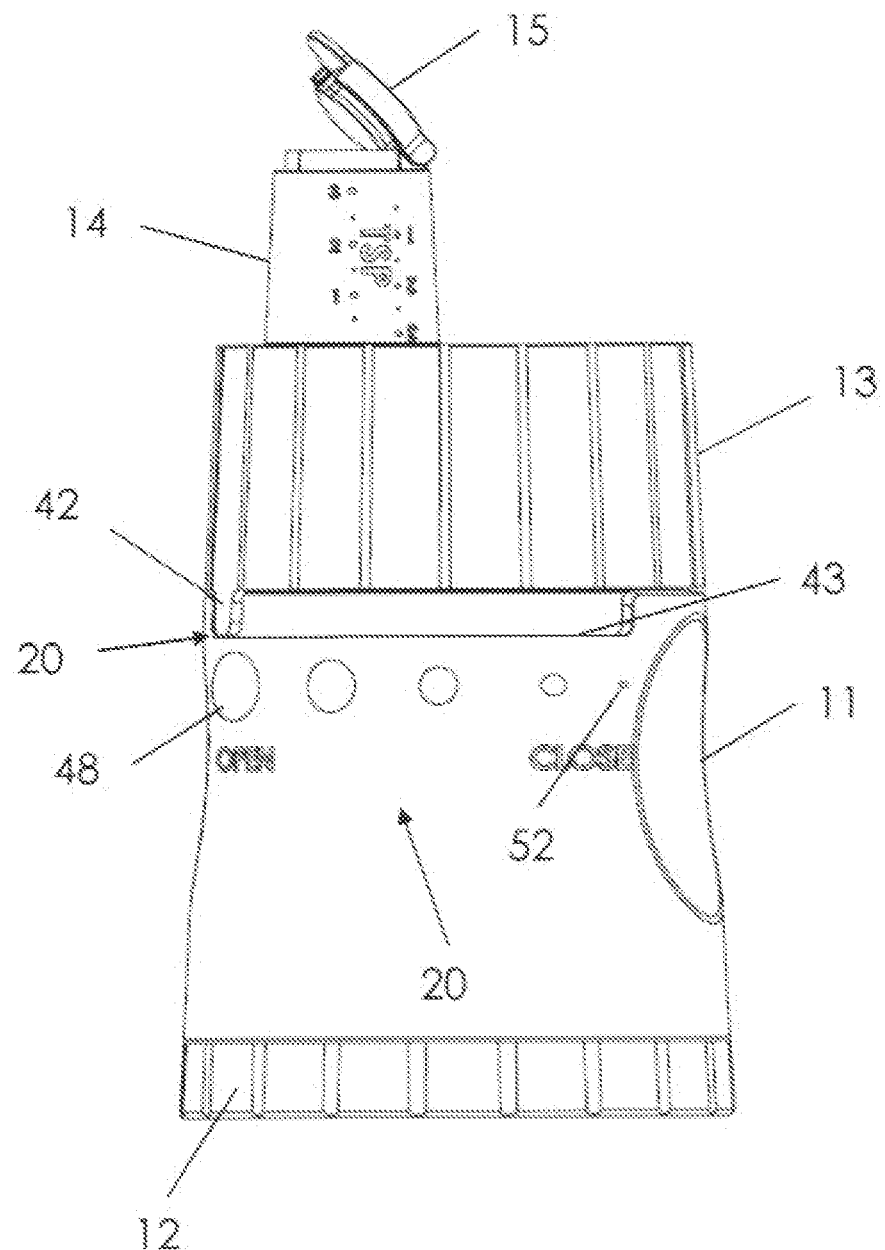
FIG. 2 is an assembled perspective of the present Measuring Cap and Bottle Assembly with the measuring cup lid open.

DETAILED DESCRIPTION OF THE
PREFERRED EMBODIMENTS

Referring to the drawings and particularly FIGS. 1 to 7, a Measuring Cap and Bottle Assembly is illustrated generally designated by the reference numeral 10, is seen to include a main bottle for receiving liquid or particulate matter through a removable threaded lower cover 12, a cap 13 which snaps over a neck portion 30 of the bottle 1, and an integral measuring cup 14 with a pivotal lid 15.

The cap 13 and the cup 14 are a one-piece plastic molding of transparent resin so the cup 14 can remain transparent and the cap 13 painted as desired.

The cap 13 has a top wall 24 and a depending annular skirt 25.

The upper part of bottle n has a reduced diameter neck 30 with integral outwardly extending and pointed snap rings 28 and 29 that snap over internal inwardly extending pointed barbs 32 and 33 with ramps formed on the interior of the skirt 25 because the inside diameter of snap rings 28 and 29 is smaller than the outside diameter of the ramped barbs 32 and 33, and as the cap is pressed down over the bottle neck 3o, the rings 28 and 29 ramp over and lock under the barbs 32 and 33 to firmly lock the cap 13 on bottle neck 30. Note that the rings 28 and 29 are formed in single transverse planes, as are the barbs 32 and 33 so that after the cap is assembled on the bottle neck 30, the cap 13 has pure rotational motion on the bottle neck as it moves from its valve open position in FIGS. 8 and 9 to its valve closed position in FIGS. 10 and 11, but the cap may be removed from the bottle neck with sufficient manual pressure for cleaning.

The valve assembly 16 includes a circular aperture 35 in top wall 34 of the bottle neck 30 and a cooperative aperture 38 in bottle cap top wall 24. Note that apertures 35 and 38 have equal diameters and are radially coincident so they are concentric in the open position of FIG. 9, and circumferentially spaced in the closed position of FIG. 1.

Also, the apertures 35 and 38 lie on a coincident circle about the axis of the Measuring Cap and Bottle Assembly so as they gradually intersect one another as the valve moves from its closed position in FIGS. 10 and 11, toward its open position in FIGS. 8 and 9, the valve assembly will gradually open as the apertures move forward in axial coincidence and full communication.

The indicator area 20 includes a downward tab 20 (FIG. 2) that lies and slides in bottle annular recess 43 and circular molded rings 48 to 52 of decreasing diameters show the state of the valve assembly 16, as tab 42 points to the rings 48 and 52 as the valve moves from its open position depicted in FIG. 2, FIG. 4, FIG. 8, and FIG. 9, to its closed position shown in FIG. 10 and FIG. 1. Note in the partly open position of the valve assembly 16 shown in FIGS. 12 and 13, the openings 35 and 38 partly overlap, and indicator tab 42 in FIG. 12, point toward the smaller circles between the open circle 48 and the closed circle 52.

Also, the side of the bottle 11 has diametrically opposed large oval depressions 56 and 58 to aid the user in grasping the Measuring Cap and Bottle Assembly 10.

Also, the bottle cover 12 has a planar bottom surface 60 and cooperating threads shown in FIG. 7 with the lower end of bottle 11.

Also, the cap (13 and 14) can be disassembled or taken apart from the upper bottle 11 by a certain force when the inside of the whole measurable bottle needs to be cleaned up.

The invention claimed is:

1. A, measuring cap and bottle assembly comprising: a container member having a side wall, a top wall and a bottom wall, a cap having a top wall covering an upper portion of the container member, a measuring cup projecting upwardly from the top wall of the cap, a valve controlling movement of flowable material from the container member to the measuring cup movable from a first open position to a second closed position, said cap controlling the valve and being rotatable unrestrictably from a first position opening said valve to a second position closing said valve, said valve including an opening in the top wall of the container member and the opening in the top wall of the cap, wherein said measuring cup extending upwardly from the opening of the top wall of the cap, said opening in the top wall of the container member being concentric with the opening in the top wall of the cap in the first open position of said valve so that said valve permits unrestricted rotatable movement of said valve in permitting the flowable material from the container member into the cup in the open position of the valve.

2. A, measuring cap and bottle assembly as defined in claim 1, wherein the cap and the measuring cup are a one-piece molding.

3. A, measuring cap and bottle assembly as defined in claim 1, wherein the cap has an annular skirt surrounding an upper neck on the container member, said skirt and upper neck having interengaging snap rings that limit the cap to rotary motion without linear motion.

4. A, measuring cap and bottle assembly as defined in claim 3, wherein the annular skirt on the cap have ramps which allow the upper neck to be snapped into and taken apart from the cap by force.

5. A, measuring cap and bottle assembly as defined in claim 4, wherein the cap and upper portion of the container member are constructed of a material that is low-coefficient of friction, wear-resistant and transparent moldable plastics, that makes functions of snapping-in, taking-apart and rotating effective and durable.

6. A, measuring cap and bottle assembly as defined in claim 1, including a bottom cover for the container member that when removed permits a free flow of the flowable material from the container member.

7. A, measuring cap and bottle assembly as defined in claim 1, wherein the cap has a flat upper surface, the container member having a top upper surface, said cap upper surface and the container member top surface each having cooperating openings therein forming the valve.

8. A, measuring cap and bottle assembly as defined in claim 1, wherein the measuring cup is transparent to view the flowable material therein.

9. A, measuring cap and bottle assembly as defined in claim 1, wherein the cap and container member have cooperating indicia thereon to show the open and closed positions of the valve.

10. A, measuring cap and bottle assembly as defined in claim 9, wherein the indicia include a plurality of different shaped rings.

11. A, measuring cap and bottle assembly as defined in claim 9, wherein the cap and the measuring cup are a one-piece molding, wherein the cap has a flat upper surface, the container member having a top upper surface, said cap upper surface and the container member top surface each having cooperating openings therein forming the valve.

12. A, measuring cap and bottle assembly as defined in claim 9, wherein the measuring cup is transparent to view the flowable material therein, wherein the cap and container member cooperating indicia thereon show the open and closed positions of the valve.

13. A, measuring cap and bottle assembly, comprising: a bottle member having a side wall, a top wall and a bottom wall, a cap having a top wall covering an upper portion of the bottle member, a measuring cup projecting upwardly from the top wall of the cap, a valve controlling movement of flowable material from the bottle member to the measuring cup movable from a first open position to a second closed position, said cap controlling the valve and being rotatable unrestrictably from a first position opening said valve to a second position closing said valve, said valve including an opening in the top wall of the bottle member and the opening in the top wall of the cap, wherein said measuring cup extending upwardly from the opening of the top wall of the cap, said opening in the top wall of the bottle member being concentric with the opening in the top wall of the cap in the first open position of said valve so that said valve permits unrestricted rotatable movement of the flowable material from the bottle member into the cup in the open position of the valve, said bottle member having an open bottom, and a threadable closing cover for said open bottom, said cap having a skirt wall over the top wall on the bottle member, interengaging members inside the cap skirt wall and a bottle member neck limiting the cap to rotational only movement relative to the bottle member.

14. A, measuring cap and bottle assembly, comprising: a bottle member having a side wall, a top wall and a bottom wall, a cap having a top wall covering an upper portion of the bottle member, a measuring cup projecting upwardly from the top wall of the cap, a valve controlling movement of flowable material from the bottle member to the measuring cup movable from a first open position to a second closed position, said cap controlling the valve and being rotatable unrestrictably from a first position opening said valve to a second position closing said valve, said valve including an opening in the top wall of the bottle member and the opening in the top wall of the cap, wherein said measuring cup extending upwardly from the opening of the top wall of the cap, said opening in the top wall of the bottle member being concentric with the opening in the top wall of the cap in the first open position of said valve so that said bottle member having an open bottom, said valve permitting unrestricted movement of the flowable material from the bottle member into the cup in the open position of the valve, and a threadable closing cover for said open bottom, said cap having a skirt wall over the top wall on the bottle member, interengaging members inside the cap skirt wall and a bottle member neck limiting the cap to rotational only movement relative to the bottle member, wherein the cap and the measuring cup are a one-piece molding, wherein the cap has a flat upper surface, wherein the measuring cup is transparent to view the flowable material therein, wherein the cap and bottle member have cooperating indicia thereon to show the open and closed positions of the valve.

* * * * *